US006782199B1

(12) United States Patent
Ye et al.

(10) Patent No.: US 6,782,199 B1
(45) Date of Patent: Aug. 24, 2004

(54) OPTICAL COMMUNICATIONS SYSTEMS WITH OPTICAL SUBSYSTEM COMMUNICATIONS LINKS

(75) Inventors: Jun Ye, Palo Alto, CA (US); Yen-Wen Lu, Los Altos, CA (US); Yu Cao, Cupertino, CA (US)

(73) Assignee: Onetta, Inc., Sunnyvale, CA (US)

( * ) Notice: Subject to any disclaimer, the term of this patent is extended or adjusted under 35 U.S.C. 154(b) by 504 days.

(21) Appl. No.: 09/696,187

(22) Filed: Oct. 26, 2000

Related U.S. Application Data
(60) Provisional application No. 60/236,177, filed on Sep. 29, 2000.

(51) Int. Cl.[7] .......................... H04B 10/08; H04B 10/00
(52) U.S. Cl. .............................. 398/10; 398/12; 398/19; 398/118; 398/83; 379/56.1; 340/7.1; 455/422.1; 359/341.4
(58) Field of Search ................................ 398/9, 33, 58, 398/83, 92, 118, 121, 127, 115, 141, 10–12, 14, 17–20, 177; 340/7.1; 370/247, 251; 375/224, 228; 455/3.02, 422.1; 356/73.1; 359/341.4; 379/56.1–56.3

(56) References Cited

U.S. PATENT DOCUMENTS

| | | | | |
|---|---|---|---|---|
| 5,673,280 A | | 9/1997 | Grubb et al. .................. 372/3 |
| 5,754,285 A | * | 5/1998 | Eslambolchi et al. ....... 356/73.1 |
| 5,790,285 A | * | 8/1998 | Mock ............................ 398/21 |
| 5,822,094 A | * | 10/1998 | O'Sullivan et al. ......... 398/18 |
| 5,859,938 A | | 1/1999 | Nabeyama et al. .......... 385/24 |
| 5,867,289 A | * | 2/1999 | Gerstel et al. ............... 398/12 |
| 5,900,969 A | | 5/1999 | Srivastava et al. .......... 359/341 |
| 6,049,413 A | | 4/2000 | Taylor et al. ................ 359/337 |
| 6,061,159 A | * | 5/2000 | Walsh ........................... 398/139 |
| 6,061,171 A | | 5/2000 | Taylor et al. ................ 359/341 |
| 6,081,366 A | | 6/2000 | Kidorf et al. ............... 359/341 |
| 6,094,298 A | | 7/2000 | Luo et al. .................... 359/346 |
| 6,115,174 A | | 9/2000 | Grubb et al. ................ 359/334 |
| 6,134,047 A | | 10/2000 | Flood et al. ................. 359/341 |
| 6,178,038 B1 | | 1/2001 | Taylor et al. ............... 359/341 |
| 6,198,572 B1 | | 3/2001 | Sugaya et al. .............. 359/337 |
| 6,215,581 B1 | | 4/2001 | Yadlowsky .................. 359/337 |
| 6,404,523 B1 | * | 6/2002 | Morikawa et al. ........... 398/79 |
| 6,545,800 B1 | * | 4/2003 | Wilson et al. ........... 359/341.4 |
| 6,583,926 B1 | * | 6/2003 | Wu et al. ................. 359/341.4 |
| 6,587,261 B1 | * | 7/2003 | Stephens et al. ............ 359/337 |
| 6,606,148 B2 | * | 8/2003 | Fredin et al. .............. 356/73.1 |
| 6,687,049 B1 | * | 2/2004 | Sulhoff et al. ........... 359/341.4 |
| 2002/0041409 A1 | * | 4/2002 | Laham et al. ................ 359/110 |
| 2002/0196427 A1 | * | 12/2002 | Todo et al. ................ 356/73.1 |
| 2003/0165340 A1 | * | 9/2003 | Jayaram et al. ................ 398/9 |

FOREIGN PATENT DOCUMENTS

| | | |
|---|---|---|
| WO | WO 00/14909 | 3/2000 |
| WO | WO 00/49721 | 8/2000 |

OTHER PUBLICATIONS

Sun et al. "Optical Fiber Amplifiers for WDM Optical Networks" Bell Labs Journal, pp. 187–206, Jan.–Mar., 1999.

(List continued on next page.)

*Primary Examiner*—Kinfe-Michael Negash
(74) *Attorney, Agent, or Firm*—G. Victor Treyz

(57) ABSTRACT

Optical communications networks are provided that allow network maintainers to monitor or control subsystems using communications links other than optical telemetry links. The communications links may be wireless links or may be based on any other suitable communications links such as links using Ethernet cables or telephone lines. Network subsystems may be provided that include communications circuitry for communicating over the communications links. A network maintainer may use network control and management software implemented on computer equipment at a different location than the subsystems to communicate with the subsystems over the communications links. Because the communications links may function independently from the optical telemetry channels in the network, new subsystems may be added to the network without disturbing the existing network management software or telemetry arrangement.

18 Claims, 5 Drawing Sheets

OTHER PUBLICATIONS

Sun et al. "Ultra Wide Band Erbium–Doped Fiber Amplifier with 80nm of Bandwidth" OSA Trends in Optics and Photonics, vol. 16 1997.

Ono et al. "Automatic Gain Control in Silica–Based EDFA with over 50nm Flat Gain Bandwidth using an all Optical Feedback Loop" 10$^{th}$ Optical Amplifiers and their Applications Technical Digest, Jun. 9–11, 1999.

Takeda et al. "Active Gain Tilt Equalization by Preferentially 1.43µm– or 1.48µm– Pumped Raman Amplification" OSA Optical Amplifiers and their Applications, vol. 30, pp. 101–105 (1999).

Kahui et al. "Dynamic–Gain–Tilt–Free Long–Wavelength Band Erbium Doped Fiber Amplifiers Utilizing Temperature Dependent Characteristics of Gain Spectrum" 25$^{th}$ Optical Fiber Communication Conference, Technical Digest, pp. 6–8,(Mar. 8, 2000).

Masuda "Review of Wideband Hybrid Amplifiers" 25$^{th}$ Optical Fiber Communication Conference, Technical Digest, pp. 2–4, (Mar. 7, 2000).

Lewis et al. "Low–Noise High Gain Dispersion Compensating Broadband Raman Amplifier" 25$^{th}$ Optical Fiber Communication Conference, Technical Digest, pp. 5–7, (Mar. 7, 2000).

Sun et al. "Average Inversion Level, Modeling and Physics of Erbium–Doped Fiber Amplifiers" IEEE Journal of Selected Topics in Quantum Electronics, vol. 3, No. 4, Aug. 1997.

* cited by examiner

OPTICAL COMMUNICATIONS SYSTEMS WITH OPTICAL SUBSYSTEM COMMUNICATIONS LINKS

This application claims the benefit of provisional patent application No. 60/236,177, filed Sep. 29, 2000.

BACKGROUND OF THE INVENTION

The present invention relates to fiber-optic communication systems, and more particularly, to optical communications systems having communications links for communicating with subsystem components.

Optical communications systems are typically made up of spans of transmission fiber that are interconnected at system nodes. The system nodes may contain optical subsystems such as optical amplifiers and add/drop modules. Optical amplifiers are used to amplify optical signals on the transmission fiber.

In a wavelength division multiplexing system, multiple communications channels are provided using multiple wavelengths of light. Add/drop modules may be used to extract a selected group of wavelengths from the transmission fiber for use by a local network. The add/drop modules may also be used to reintroduce the dropped wavelengths to support communications that originate in the local network.

An optical communications network may have network control and management software and an overall optical network operating system that allows the status of certain optical subsystem components to be monitored or controlled. One of the multiple wavelengths of light in a wavelength division multiplexing system may be used to support a telemetry channel that is used for this purpose. Optical filters may be used at the system nodes to separate the telemetry channel from the normal communications channels supported by the fiber.

It may be difficult to add new subsystems to an optical communications network unless the new subsystems are compatible with the existing network control and management system software and telemetry channel arrangement. If a new network component does not interact properly with the existing system infrastructure, it may not be possible to monitor or control the new component after it has been installed or the new component may interfere with the operation of the network. Moreover, some network maintainers may wish to add new subsystems to the network without modifying the existing network software to make it compatible with the new subsystems. This is because the existing network software may have been developed by a third-party or because it is too complicated or too risky to make such modifications.

It is an object of the present invention to provide ways in which to facilitate the addition of subsystems to optical communications networks.

It is another object of the invention to provide optical communications systems arrangements in which communications links other than standard optical telemetry channels may be used to monitor or control optical subsystem components.

SUMMARY OF THE INVENTION

These and other objects of the invention are accomplished in accordance with the present invention by providing arrangements for optical communications networks that allow network maintainers to monitor or control subsystems using communications links other than standard optical telemetry links. The communications links may be wireless links or may be based on any other suitable communications links such as links using Ethernet cables or telephone lines. Wireless communications links that may be used include wireless links based on satellite communications, cellular telephone communications, paging communications, or any other suitable wireless communications arrangement.

Subsystems may be provided for the network that include communications circuitry for communicating over the communications links. The network maintainer may use network control and management software implemented on computer equipment to communicate with the subsystems over the communications links. Because the communications links may function independently from the optical telemetry channels in the network, new subsystems may be added to the network without disturbing the existing network management software or telemetry arrangement.

Further features of the invention and its nature and various advantages will be more apparent from the accompanying drawings and the following detailed description of the preferred embodiments.

DETAILED DESCRIPTION OF THE PREFERRED EMBODIMENTS

Figure 1:
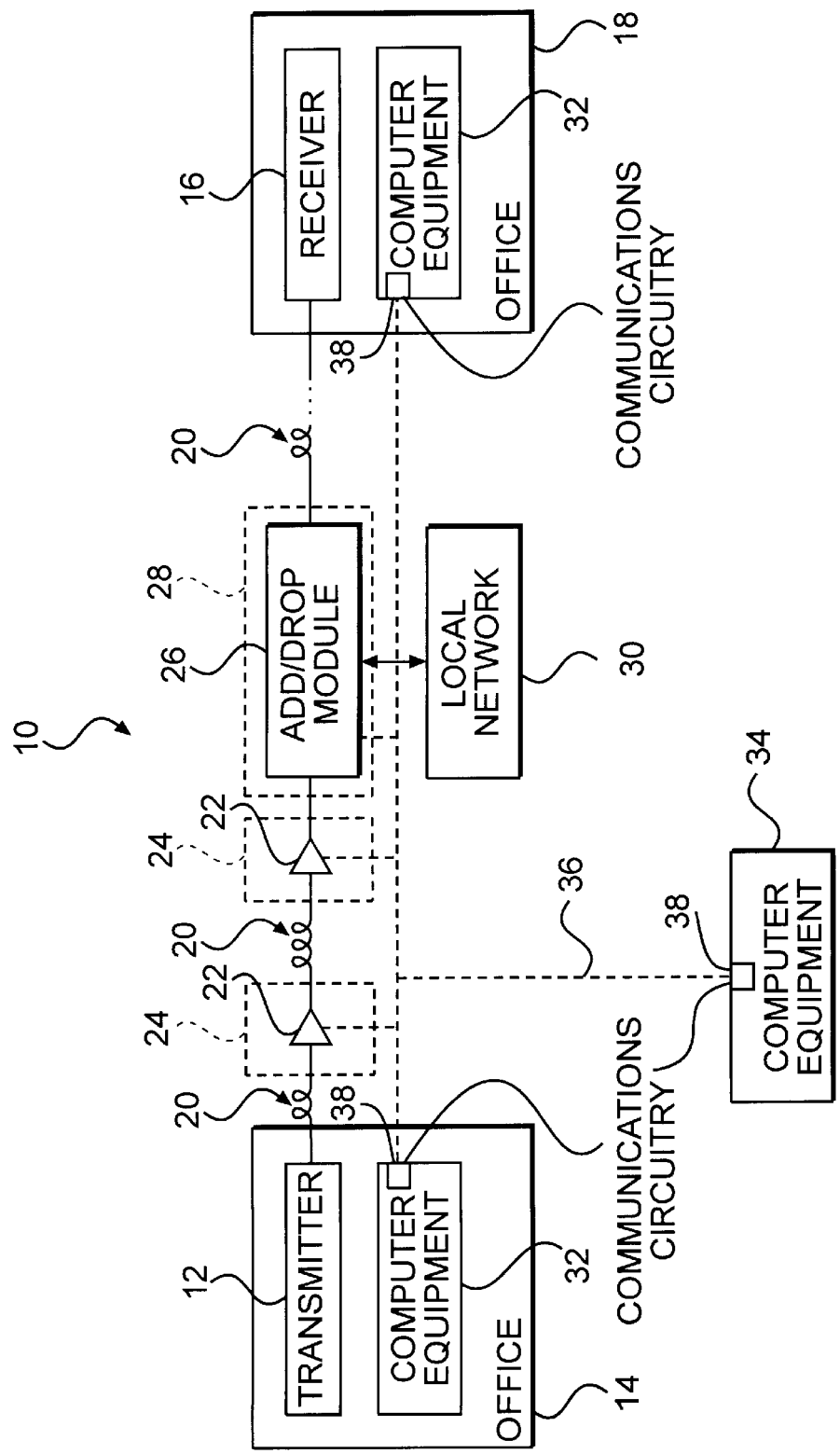
FIG. 1 is a schematic diagram of an illustrative optical communications system in accordance with the present invention.

A portion of an illustrative optical communications system 10 in accordance with the present invention is shown in FIG. 1. As shown in FIG. 1, a transmitter 12 at an office 14 may transmit information to a receiver 16 at an office 18 over a series of fiber links 20. Each fiber link may include a span of optical transmission fiber. Fiber links 20 may be on the order of 40–120 km in length for use in long-haul networks. This is merely illustrative. Fiber spans 20 may be any suitable length for use in an optical communications network.

As optical signals travel along the optical fibers 20, signal strength is attenuated. Optical amplifiers 22 at system nodes 24 may therefore be used to amplify the optical signals between successive spans of fiber.

The communications link of FIG. 1 may be used to support wavelength-division multiplexing arrangements in which multiple communications channels are provided using multiple wavelengths of light. For example, the link of FIG. 1 may support a system with 40 channels, each using a different optical carrier wavelength. Optical channels may be modulated at, for example, approximately 10 GHz (OC-192) or approximately 40 GHz (OC-768). The carrier wavelengths that are used may be in the vicinity of 1530–1560 nm.

Add/drop modules such as add/drop module 26 at system node 28 may be used to extract the wavelengths for certain channels from the link and to provide the information on those channels to a local network 30. Add/drop modules such as add/drop module 26 may also be used to support communications traffic from local network 30 by adding the dropped channel wavelengths back into to the link. The added channels may be passed to receiver 16 with the remainder of the original 40 channels transmitted from transmitter 12.

Amplifiers such as amplifiers 22 and add/drop modules such as add/drop modules 26 are examples of optical subsystems that may be used in network 10. These are merely illustrative examples. If desired, other suitable subsystems may be used (e.g., switches, dispersion compensation elements, filters, etc.).

The optical subsystems may communicate with computer equipment such as computer equipment 32 that is located at offices (e.g., central offices) such as offices 14 and 18 or computer equipment such as computer equipment 34 that is located at a location remote from offices 14 and 18 (e.g., in a network management facility). Regardless of the location of the network computer equipment, such equipment may be used to support network software such as network control and management software and optical network operating system software that is used to monitor and control the operation of the network. The network software that is implemented on the network computer equipment may communicate with the optical network subsystems over communications links such as communications link 36.

The communications capabilities of communications link 36 may be provided using one or more individual communications links. Link 36 is shown as a single interconnected communications link in FIG. 1 for clarity. Link 36 is preferably a communications link that is provided in addition to any optical telemetry link that may be used in fibers 20. Such fiber-based optical telemetry links may be provided using a dedicated carrier wavelength (or wavelengths). Optical filters may be used at the optical subsystems (e.g., at amplifiers such as amplifiers 22) to separate the telemetry channel from the normal communications channels supported by the fiber. Because link 36 is separate from the networks's optical telemetry channel (or channels), new subsystems such as amplifiers, add/drop modules, switches, etc. may be added to the network without modifying the network management software or telemetry channel arrangement used to communicate with existing subsystems. New subsystems may therefore be added with greater flexibility than would otherwise be possible.

Communications link 36 may be based on one or more wireless links or may be based on any other suitable communications links such as links using Ethernet cables or telephone lines. Wireless communications links that may be used in link 36 include wireless links based on satellite communications, cellular telephone communications, paging communications, or any other suitable wireless communications arrangement. The subcomponents in such links (e.g., satellites, terrestrial antennas, etc.) are not shown in FIG. 1 for clarity. An advantage of using wireless links is that fewer cables and connectors may be required so that installation cost and complexity may be reduced.

Any suitable communications protocols and equipment may be used for link 36. As an example, each subsystem may be provided with a cellular telephone module and may be assigned a cellular telephone number. The amount of information transmitted over link 36 need not be great, so relatively low bandwidth wireless links such as paging links may be used. Satellite systems may be used where cellular telephone or paging coverage is not available.

If desired, network management software for communicating over link 36 may be used on computer equipment 32 and 34 that is separate from the existing network control and management system and optical network operating system software installed on network 10. Computer equipment such as computer equipment 32 and 34 may be the same computer equipment that is used to support the existing network software or may be separate from such computer equipment. Computer equipment 32 and 34 may have communications circuitry 38 for supporting wireless or wired communications or other suitable communications over link 36.

If desired, communications link 36 may be used to support the same types of communications that are supported using dedicated optical telemetry channels. Such communications may include, for example, communications for monitoring the status of subsystem components and for controlling such components. Communications link 36 may also be used to support communications related to subsystem features that are not supported by the optical telemetry channels in the existing optical network infrastructure. As an example, the monitoring and adjusting of a particular optical amplifier setting may involve the monitoring of variables that generally cannot be monitored using an existing dedicated optical telemetry channel in the existing network.

Figure 2:
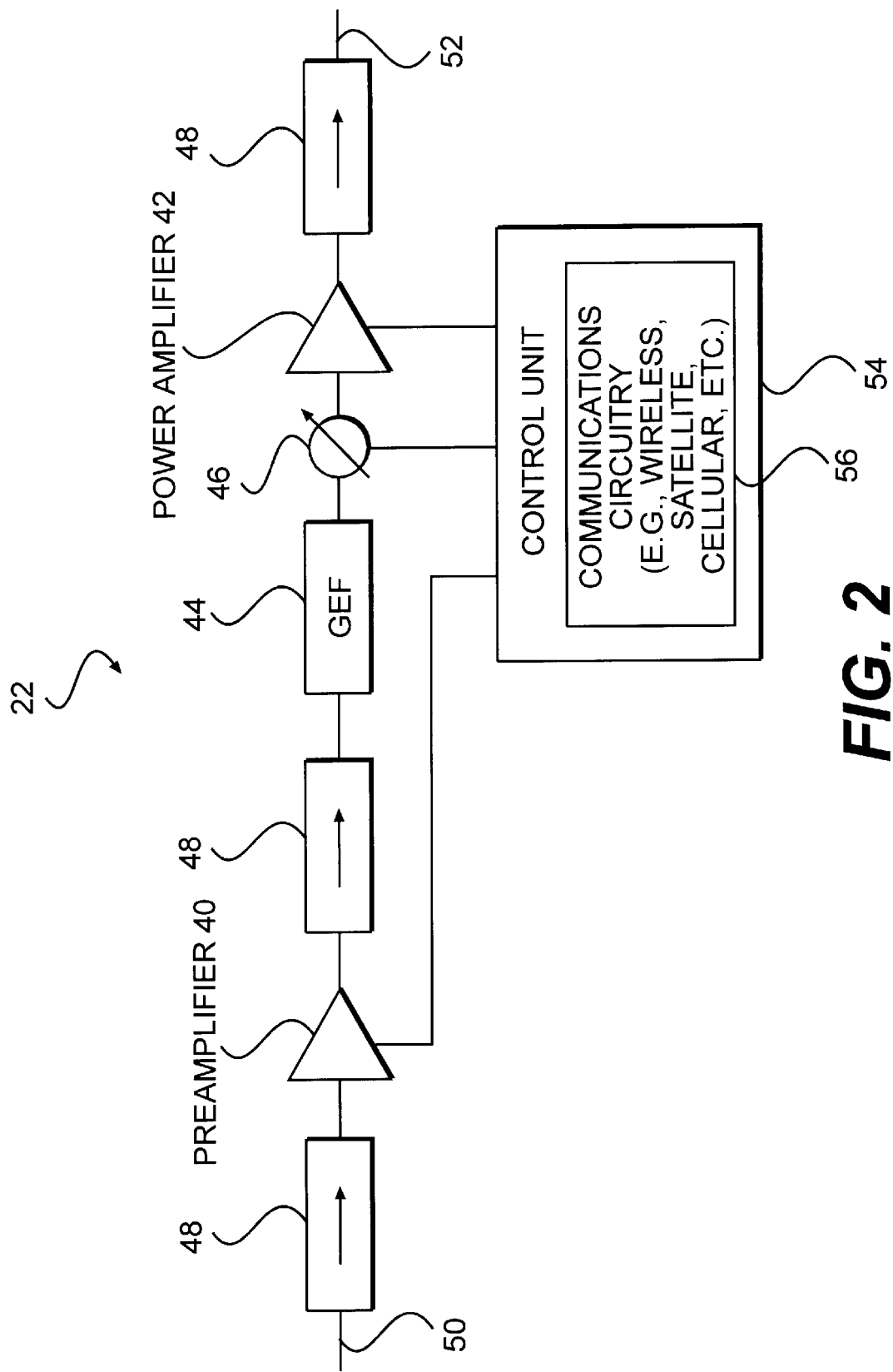
FIG. 2 is a schematic diagram of an illustrative optical amplifier subsystem having a control unit with wireless communications circuitry in accordance with the present invention.

Amplifiers such as amplifiers 22 may be based on any suitable amplifier arrangement including fiber amplifiers, solid-state amplifiers, etc. As an example, amplifiers 22 may use rare-earth-doped fibers such as erbium-doped fibers. An illustrative amplifier subsystem 22 is shown in FIG. 2. Optical signals (e.g., 40 channels in a wavelength division multiplexing system) may be provided at input 50. Amplified output signals may be provided at output 52. Amplifier 22 may have a preamplifier stage 40 and a power amplifier stage 42, which may each be based on one or more rare-earth-doped fibers (e.g., erbium-doped fibers). The doped fibers may be pumped using any suitable source of pump light such as diode lasers or cladding-pumped Raman lasers, etc.

Amplifier 22 may have a gain equalization filter 44 for flattening the spectral response of amplifier stages 40 and 42. A variable optical attenuator 46 may be used to adjust the amount of power that is passed from preamplifier stage 40 to power amplifier stage 42. Variable optical attenuator 46 may be any suitable optical attenuator with an attenuation level that may be controlled (e.g., electrically). By adjusting the setting of variable optical attenuator 46, amplifier 22 may be configured to operate in environments having different input power conditions. Isolators 48 may be used to isolate the components in amplifier 22 from backwards propagating light.

Amplifier stages 40 and 42 and the variable optical attenuator and any other suitable components of amplifier 22 may be monitored and controlled using a control unit 54. Control unit 54 may use any suitable control electronics such as microprocessor-based control electronics for providing monitoring and control functions for amplifier 22.

Control unit 54 may include communications circuitry 56 (e.g., wireless communications circuitry or communications circuitry for wired communications) that allows control unit 54 to communicate with computer equipment 32 and 34 over communications link 36. Any suitable arrangement may be used to allow control unit 54 to communicate with computer equipment such as computer equipment 32 and 34 or other network control equipment. For example, communications circuitry 56 may be used to send and receive communications with the communications circuitry 38 in computer equipment 32 and 34 over a satellite link, a terrestrial wireless network link such as a cellular telephone link or terrestrial paging network link, a wired telephone link, an Ethernet cable link, or any other suitable link. If desired, amplifier 22 may also include communications circuitry for communicating with a telemetry channel that is provided at input 50 using a particular wavelength of light. Optical filters may be used to extract such a channel from the various signals provided at input 50 and to add such a channel to the signals being provided at output 52. Control unit 54 may have receiver and transmitter components that allow control unit 54 to receive and transmit optical signals for the telemetry channel.

Another subsystem that may be used in communications network 10 is an add/drop module such as add/drop module 26 of FIG. 1. Add/drop modules such as add/drop module 26 may use semiconductor devices, fiber devices, and other components to selectively add and drop particular wavelength channels from fiber 20.

Figure 3:
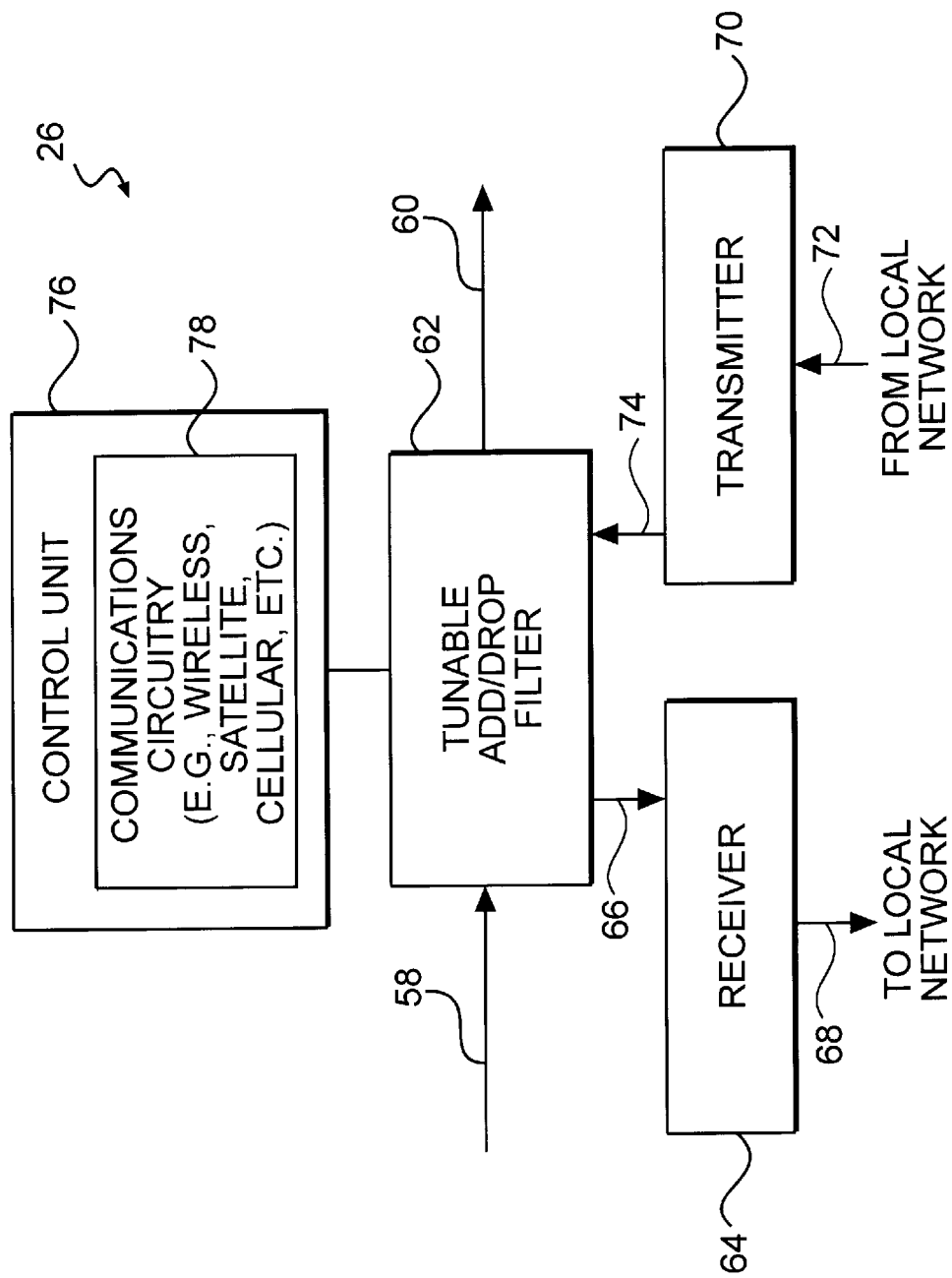
FIG. 3 is a schematic diagram of an illustrative wavelength add/drop subsystem having a control unit with wireless communications circuitry in accordance with the present invention.

An illustrative add/drop module 26 is shown in FIG. 3. In the optical add/drop subsystem arrangement of FIG. 3, optical input signals are provided at input 58 and optical output signals are provided at output 60. A tunable add/drop filter 62 may be used to extract channels carried on certain wavelengths for use by local network 30 (FIG. 1). The extracted channels may be provided to a receiver 64 using fiber link 66. If desired, receiver 64 may be used to perform optical-to-electrical conversion of the signals on the extracted channels. The extracted signals may then be provided to local network 30 using output path 68. Communications traffic from local network 30 may be provided to transmitter 70 in the form of electrical signals using input path 72. Transmitter 70 may convert the electrical signals from input path 72 to optical signals. Transmitter 70 may supply these optical signals to add/drop filter 62 over fiber path 74. The optical signals supplied by transmitter 70 may use the same channels that were extracted from input 58 by filter 62. Filter 62 may add these channels to output 60.

Add/drop module 26 may have a control unit 76 for controlling and monitoring tunable filter 62 and other components in module 26. Control unit 76 may have communications circuitry 78 (e.g., wireless communications circuitry or communications circuitry for wired communications) that allows control unit 76 to communicate with computer equipment 32 and 34 over communications link 36. Any suitable arrangement may be used to allow control unit 76 to communicate with computer equipment such as computer equipment 32 and 34 or other network control equipment. For example, communications circuitry 78 may be used to send and receive communications with the communications circuitry 38 in computer equipment 32 and 34 over a satellite link, a terrestrial wireless network link such as a cellular telephone link or terrestrial paging network link, a wired telephone link, an Ethernet cable link, or any other suitable link. If desired, add/drop module 26 may also include communications circuitry for communicating with a telemetry channel that is provided at input 58 using a particular wavelength of light. Optical filters may be used to extract such a channel from the various signals provided at input 58 and to add such a channel to the signals being provided at output 60. Control unit 76 may have receiver and transmitter components that allow control unit 76 to receive and transmit optical signals for the telemetry channel.

Figure 4:
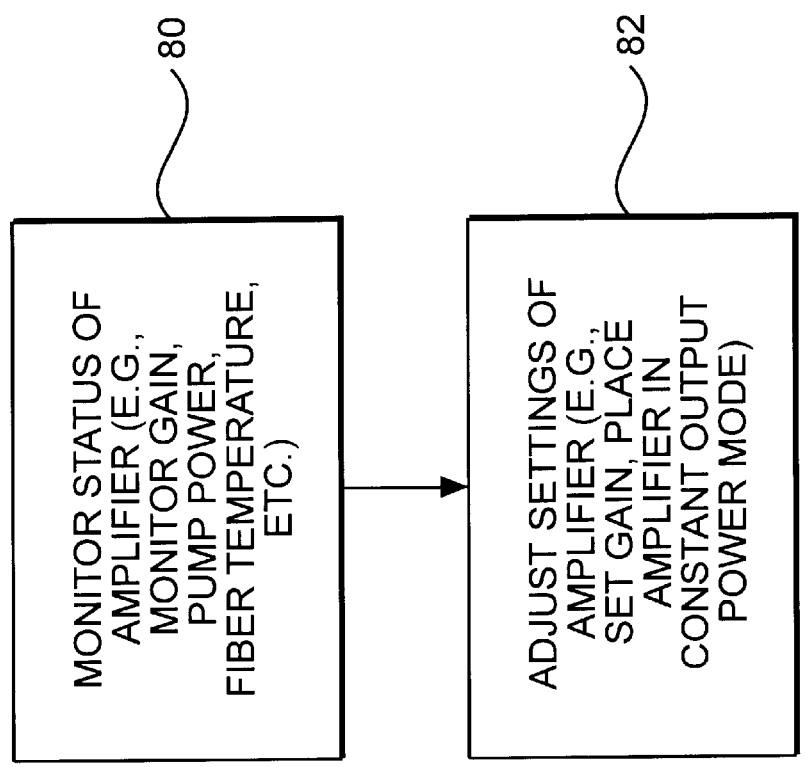
FIG. 4 is a flow chart of illustrative steps involved in monitoring and controlling the amplifier subsystem of FIG. 2 in accordance with the present invention.

Illustrative steps involved in monitoring and controlling subsystems such as amplifier modules 22 using communications link 36 are shown in FIG. 4. At step 80, the status of the components in amplifier 22 may be monitored. For example, the gain of erbium-doped-fiber amplifier components may be monitored, the power levels of the pumps used in amplifier 22 may be monitored, the temperature of the fiber coils in the amplifier stages may be monitored (e.g., using thermocouples or other thermal sensors), etc. These are merely illustrative examples of the types of amplifier parameters that may be monitored. Any suitable amplifier parameters may be monitored if desired. The information that is gathered on the status of the components of amplifier 22 may be provided to computer equipment 32 and 34 over communications link 36 for use by the network management software.

At step 82, network management software running on computer equipment such as computer equipment 32 and 34 may be used to adjust the settings of amplifier 22 over communications link 36. For example, control commands may be transmitted over link 36 that control unit 54 may use in determining how to operate the components of amplifier 22. Such control commands may be used to set the amplifier gain, to place the amplifier in a constant output power mode, to adjust the power of the pumps used by the fiber amplifier coils, to adjust the attenuation produced by the variable optical attenuator, etc.

Figure 5:
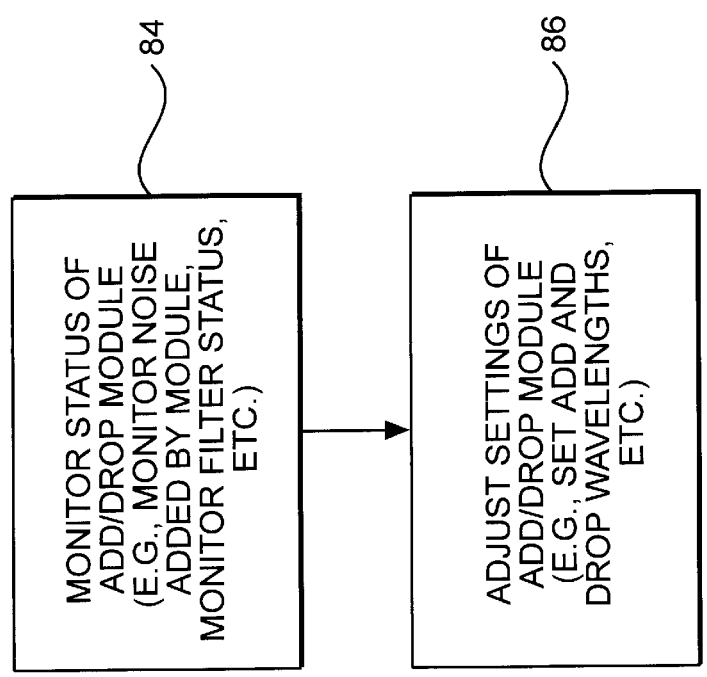
FIG. 5 is a flow chart of illustrative steps involved in monitoring and controlling the add/drop module of FIG. 3 in accordance with the present invention.

Illustrative steps involved in monitoring and controlling subsystems such as add/drop module 26 using communications link 36 are shown in FIG. 5. At step 84, the status of the components in add/drop module 26 may be monitored. For example, the noise added by module 26 may be monitored using an optical sensor, the status of tunable add/drop filter 62 may be monitored, etc. These are merely illustrative examples of the types of add/drop module parameters that may be monitored. Any suitable add/drop parameters may be monitored if desired. The information that is gathered on the status of the components of add/drop module 26 may be provided to computer equipment 32 and 34 over communications link 36 for use by the network management software.

At step 86, network management software running on computer equipment such as computer equipment 32 and 34 may be used to adjust the settings of add/drop module 34 over communications link 36. For example, control commands may be transmitted over link 36 that control unit 76 may use in determining how to operate the components of add/drop module 26. Such control commands may be used to set the add and drop wavelengths, etc.

It will be understood that the foregoing is merely illustrative of the principles of this invention, and that various modifications can be made by those skilled in the art without departing from the scope and spirit of the invention. For example, optical signals may be amplified in any suitable wavelength range and any suitable number of channels may be supported by the fibers in the system. The subsystems that communicate with the network management system over the communications link may include any suitable components such as filters, switches, amplifiers, dispersion compensation elements, etc.

What is claimed is:

1. An optical communications network optical subsystem in a fiber-optic communications link that is monitored by computer equipment at a different location than the optical subsystem, comprising:

optical subsystem components; and wireless communications circuitry for wirelessly communicating with the computer equipment over a wireless communications link, wherein the optical subsystem components include amplifier components.

2. The optical communications network optical subsystem defined in claim 1 wherein the wireless communications link includes a satellite communications link and wherein the wireless communications circuitry in the optical communications network optical subsystem is configured to communicate with the computer equipment using the satellite communications link.

3. The optical communications network optical subsystem defined in claim 1 wherein the wireless communications link includes a cellular telephone communications link and wherein the wireless communications circuitry in the optical communications network optical subsystem is configured to communicate with the computer equipment using the cellular telephone communications link.

4. The optical communications network optical subsystem defined in claim 1 wherein the wireless communications link includes terrestrial antennas and wherein the wireless communications circuitry in the optical communications network optical subsystem is configured to communicate with the computer equipment using the terrestrial antennas.

5. The optical communications network optical subsystem defined in claim 1 wherein the wireless communications link includes a paging link and wherein the wireless communications circuitry in the optical communications network optical subsystem is configured to communicate with the computer equipment using the paging link.

6. The optical communications network optical subsystem defined in claim 1 wherein the computer equipment comprises network computer equipment on which network control and management software is implemented and wherein the wireless communications circuitry in the optical communications network optical subsystem is configured to communicate with the network computer equipment on which network control and management software is implemented.

7. The optical communications network optical subsystem defined in claim 1 wherein the computer equipment comprises network computer equipment that controls the optical subsystem components over the wireless communications link and wherein the wireless communications circuitry in the optical communications network optical subsystem is configured to communicate with the network computer equipment.

8. The optical communications network optical subsystem defined in claim 1 wherein the optical subsystem components include rare-earth-doped amplifier components.

9. An optical communications network optical subsystem in a fiber-optic communications link that is monitored by computer equipment at a different location than the optical subsystem, comprising:

optical subsystem components; and wireless communications circuitry for wirelessly communicating with the computer equipment over a wireless communications link, wherein the optical subsystem components include add/drop module components.

10. A method for monitoring an optical communications network optical subsystem in a fiber-optic communications link using computer equipment at a different location than the optical subsystem, wherein the optical communications network optical subsystem has optical subsystem components and wireless communications circuitry, comprising:

using the computer equipment to communicate with the wireless communications circuitry over a wireless communications link, wherein the optical subsystem components include amplifier components.

11. The method defined in claim 10 wherein the wireless communications link includes a satellite communications link, the method further comprising communicating with the wireless communications circuitry using the satellite communications link.

12. The method defined in claim 10 wherein the wireless communications link includes a cellular telephone communications link, the method further comprising communicating with the wireless communications circuitry using the cellular telephone communications link.

13. The method defined in claim 10 wherein the communications link includes terrestrial antennas, the method further comprising communicating with the wireless communications circuitry using the terrestrial antennas.

14. The method defined in claim 10 wherein the communications link includes a paging link, the method further comprising communicating with the wireless communications circuitry using the paging link.

15. The method defined in claim 10 wherein the computer equipment comprises network computer equipment on which network control and management software is implemented, the method further comprising communicating with the wireless communications circuitry over the wireless link using the network computing equipment.

16. The method defined in claim 10 wherein the computer equipment comprises network computer equipment, the method further comprising controlling the optical subsystem components over the wireless communications link using the network computer equipment.

17. The method defined in claim 10 wherein the optical subsystem components include rare-earth-doped amplifier components.

18. A method for monitoring an optical communications network optical subsystem in a fiber-optic communications link using computer equipment at a different location than the optical subsystem, wherein the optical communications network optical subsystem has optical subsystem components and wireless communications circuitry, comprising:

using the computer equipment to communicate with the wireless communications circuitry over a wireless communications link, wherein the optical subsystem components include add/drop module components.

* * * * *